US010686825B2

(12) United States Patent
Doyle (10) Patent No.: US 10,686,825 B2
(45) Date of Patent: Jun. 16, 2020

(54) MULTIPLE PRESENTATION FIDELITY-LEVEL BASED QUANTITATIVE CYBER RISK DECISION SUPPORT SYSTEM

(71) Applicant: Frederick Doyle, Albuquerque, NM (US)

(72) Inventor: Frederick Doyle, Albuquerque, NM (US)

( * ) Notice: Subject to any disclaimer, the term of this patent is extended or adjusted under 35 U.S.C. 154(b) by 151 days.

(21) Appl. No.: 16/122,785

(22) Filed: Sep. 5, 2018

(65) Prior Publication Data
US 2019/0124108 A1 Apr. 25, 2019

Related U.S. Application Data (60) Provisional application No. 62/576,460, filed on Oct. 24, 2017.

(51) Int. Cl.
*H04L 29/06* (2006.01)
*G06F 21/45* (2013.01)

(52) U.S. Cl.
CPC .......... *H04L 63/1433* (2013.01); *G06F 21/45* (2013.01); *H04L 63/1425* (2013.01); *H04L 63/1458* (2013.01); *H04L 63/20* (2013.01); *H04L 63/1408* (2013.01); *H04L 63/1441* (2013.01)

(58) Field of Classification Search
CPC . H04L 63/1433; H04L 63/20; H04L 63/1458; H04L 63/1425; H04L 63/1441; H04L 63/1408; G06F 21/45; G06F 21/577
See application file for complete search history.

(56) References Cited

U.S. PATENT DOCUMENTS

| | | | | |
|---|---|---|---|---|
| 8,332,959 | B2* | 12/2012 | Chen | G06Q 10/10 706/52 |
| 8,984,644 | B2* | 3/2015 | Oliphant | G06F 16/245 726/25 |
| 2007/0067848 | A1* | 3/2007 | Gustave | G06F 21/577 726/25 |
| 2009/0228316 | A1* | 9/2009 | Foley | G06Q 10/0635 705/7.28 |
| 2010/0050264 | A1* | 2/2010 | Aebig | G06F 21/577 726/25 |
| 2012/0317058 | A1* | 12/2012 | Abhulimen | G06N 20/00 706/2 |
| 2013/0347116 | A1* | 12/2013 | Flores | H04L 63/1433 726/25 |

(Continued)

*Primary Examiner* — Mohammed Waliullah (57) ABSTRACT

A multiple presentation fidelity-level based quantitative cyber risk decision support system. The system comprises a processor, a memory, a data store comprising cyber threat event log entries, and a cyber threat analysis application stored in the memory that, when executed by the processor, analyzes the log entries, executes cyber threat materialization probability update rules on risk elements based on analyzing the log entries, builds a first presentation of an amplitude of cyber risk using a first presentation method, presents the first presentation on a workstation associated with a first level of user, builds a second presentation comprising an ordered list of actions to perform to mitigate cyber risk using a second presentation method, and presents the second presentation on a workstation associated with a second level of user.

20 Claims, 5 Drawing Sheets

(56) References Cited

U.S. PATENT DOCUMENTS

| | | | | |
|---|---|---|---|---|
| 2014/0137257 A1* | 5/2014 | Martinez | ............ | H04L 63/1433 |
| | | | | 726/25 |
| 2014/0337971 A1* | 11/2014 | Casassa Mont | ...... | G06F 21/552 |
| | | | | 726/22 |
| 2015/0205954 A1* | 7/2015 | Jou | ........................ | G06F 21/316 |
| | | | | 726/22 |
| 2015/0347750 A1* | 12/2015 | Lietz | ..................... | G06F 21/552 |
| | | | | 726/23 |
| 2019/0147378 A1* | 5/2019 | Mo | ..................... | H04L 63/1433 |
| | | | | 726/25 |

* cited by examiner

MULTIPLE PRESENTATION FIDELITY-LEVEL BASED QUANTITATIVE CYBER RISK DECISION SUPPORT SYSTEM

CROSS-REFERENCE TO RELATED APPLICATIONS

This application claims benefit of U.S. provisional patent application Ser. No. 62/576,460 filed Oct. 24, 2017, and entitled "Fidelity-Based Multiple Level Cyber Risk Management System," by Frederick Doyle, which is hereby incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic devices such as computers, phones, and peripheral equipment, as well as communications networks such as the Internet and the cell phone network are increasingly susceptible to cyber threats. Cyber threats refer to a wide variety of exposures associated with electronic devices such as computers and mobile phones. A cyber threat can involve electronically stealing confidential information, such as credit card information or private emails. A cyber threat can include threats that impact a device or communication network without malicious intent, such as electrical power faults, failed hardware, excessively high temperature, too much humidity, too little humidity, or non-malicious human error. Cyber threats can also include malicious acts such as electronically hijacking a computer for the purpose of broadcasting unsolicited commercial messages (i.e., "spam") from that computer. A cyber threat can involve attacking a computer system and/or communication system with a great number of network traffic packets, known as a denial of service attack (DoS). A cyber threat can involve attacking a computer system via a malicious executable embedded within what may appear to be a legitimate executable, known as a Trojan horse. There are yet other varieties of cyber threats.

Malicious cyber threats and cyberattacks are becoming more common, more ingenious, and more difficult to detect and parry in a timely manner. Controls and counter measures may be applied to electronic devices and communication systems to reduce their susceptibility to cyber threats. Various electronic security practices and policies can reduce susceptibility to threats. The cyber threat environment is very dynamic and quick to evolve. A balance is desirably found between deploying controls and countermeasures to mitigate threats and cyberattacks and retaining a computing and communication system that is accessible by ordinary human users and avoiding breaking an enterprise's budget through buying every available countermeasure.

SUMMARY

In an embodiment, a method of mitigating cyber threat risks using a multiple presentation fidelity-level based quantitative cyber risk decision support system is disclosed. The method comprises creating a plurality of risk elements, where a risk element comprises an initial potential asset impact associated with an asset, an initial assessment of a probability of a cyber threat associated to the asset materializing, an initial fidelity assessment of the cyber threat materialization probability, a cyber threat materialization probability update rule, and a fidelity aging rule associated with the fidelity assessment. The method further comprises storing cyber threat event log entries into a data store, where each log entry comprises information about an event associated with a cyber threat associated with an asset, reading the cyber threat event log entries from the data store by a cyber threat analysis application executing on a computer system, and analyzing the cyber threat event log entries by the analysis application. The method further comprises, for each risk element, executing the asset cyber threat materialization probability update rule of the risk element based on the analyzing of the cyber threat event log entries to determine a current cyber threat materialization probability associated with the asset and to determine a current fidelity assessment of the probability. The method further comprises executing a first presentation method on the computer system, where the first presentation method builds a first presentation based on the plurality of initial potential asset impacts, based on the plurality of current cyber threat materialization probabilities, and based on the plurality of fidelity assessments and presents the first presentation on workstations associated with a first level of user, where the first presentation comprises an amplitude of cyber risk. The method further comprises executing a second presentation method on the computer system, where the second presentation method builds a second presentation based on the plurality of initial potential asset impacts, based on the plurality of current cyber threat materialization probabilities, and based on the plurality of fidelity assessments and presents the second presentation on workstations associated with a second level of user, where the second presentation comprises an ordered list of cyber threat countermeasure actions for a security operations center (SOC) technician to perform to mitigate cyber risks and performing at least one of the cyber threat countermeasure actions in the ordered list of actions.

In another embodiment, a method of mitigating cyber threat risks in a plurality of computers using a multiple presentation fidelity-level based quantitative cyber risk decision support system is disclosed. The method comprises creating a plurality of risk elements, where a risk element comprises an initial potential asset impact associated with an asset, an initial assessment of a probability of a cyber threat associated to the asset materializing, an initial fidelity assessment of the cyber threat materialization probability, a cyber threat materialization probability update rule, and a fidelity aging rule associated with the fidelity assessment. The method further comprises storing cyber threat event log entries into a data store, where each cyber threat event log entry comprises information about an event associated with a cyber threat associated with an asset, reading the cyber threat event log entries from the data store by a cyber threat analysis application executing on a computer system, and analyzing the cyber threat event log entries by the analysis application. The method further comprises, for each risk element, executing the asset cyber threat materialization probability update rule of the risk element based on the analyzing of the cyber threat event log entries to determine a current probability of cyber threat materialization probability and to determine a current fidelity assessment of the probability. The method further comprises executing a first presentation method on the computer system, where the first presentation method builds a first presentation based on the plurality of initial potential asset impacts, based on the plurality of current cyber threat materialization probabilities, and based on the plurality of fidelity assessments and presents the first presentation on workstations associated with a first level of user, where the first presentation comprises an amplitude of cyber risk. The method further comprises executing a second presentation method on the computer system, where the second presentation method builds a second presentation based on the plurality of initial potential asset impacts, based on the plurality of current cyber threat materialization probabilities, and based on the plurality of fidelity assessments and presents the second presentation on workstations associated with a second level of user, where the second presentation comprises an ordered list of actions for a security operations center (SOC) technician to perform to mitigate cyber risks. The method further comprises, for each risk element, executing the fidelity aging rule associated with the risk element to produce an updated fidelity assessment and executing the first presentation method on the computer system, where the first presentation method builds a third presentation based on the plurality of initial potential asset impacts, based on the plurality of current cyber threat materialization probabilities, and based on the plurality of updated fidelity assessments and presents the third presentation on workstations associated with the first level of user, where the third presentation comprises an amplitude of cyber risk. The method further comprises executing the second presentation method on the computer system, where the second presentation method builds a fourth presentation based on the plurality of initial potential asset impacts, based on the plurality of current cyber threat materialization probabilities, and based on the plurality of updated fidelity assessments and presents the fourth presentation on workstations associated with the second level of user, where the fourth presentation comprises a second ordered list of actions for the security operations center (SOC) technician to perform to mitigate cyber risks.

In another embodiment, a multiple presentation fidelity-level based quantitative cyber risk decision support system is disclosed. The system comprises a processor, a non-transitory memory, a data store, and a cyber threat analysis application stored in the non-transitory memory. The non-transitory memory further stores a plurality of risk elements, where each risk element comprises an initial potential asset impact associated with an asset, an initial assessment of a probability of a cyber threat associated to the asset materializing, an initial fidelity assessment of the cyber threat materialization probability, a cyber threat materialization probability update rule, and a fidelity aging rule associated with the fidelity assessment. The data store comprises cyber threat event log entries, where each cyber threat event log entry comprises information about an event associated with a cyber threat associated with an asset. When executed by the processor, the cyber threat analysis application reads the cyber threat event log entries from the data store, analyzes the cyber threat event log entries, and for each risk element, executes the asset cyber threat materialization probability update rule of the risk element based on the analyzing of the cyber threat event log entries to determine a current cyber threat materialization probability and to determine a current fidelity assessment of the probability. The application further executes a first presentation method, where the first presentation method builds a first presentation based on the plurality of initial potential asset impacts, based on the plurality of current cyber threat materialization probabilities, and based on the plurality of fidelity assessments and presents the first presentation on workstations associated with a first level of user, where the first presentation comprises an amplitude of cyber risk. The application further executes a second presentation method, where the second presentation method builds a second presentation based on the plurality of initial potential asset impacts, based on the plurality of current cyber threat materialization probabilities, and based on the plurality of fidelity assessments and presents the second presentation on workstations associated with a second level of user, where the second presentation comprises an ordered list of actions for a security operations center (SOC) technician to perform to mitigate cyber risks.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In evaluating an enterprise's immediate exposure to cyber threats a cyber risk value may be quantified or calculated based on the potential impact if a cyber threat is expressed or manifested and the probability that the cyber threat will be manifested. The potential impact is the value of an asset and/or the potential cost of the negative consequences of the expression or manifestation of the cyber threat, and the probability is the likelihood of the cyber threat occurring against the asset when considering the controls and countermeasures in place.

Identifying the potential impact of a cyber threat expression or manifestation is a difficult and engrossing task, as is calculating the probability of a cyber threat manifestation. Compounding this task is the fact that potential impacts may constantly change throughout the course of normal business operations and that probability may change according to implemented controls, countermeasures, and even external factors such as electrical power availability or malicious actor sentiment. And as new cyberattack tactics are developed, both the potential impact of cyber threats and the probability of successful cyberattacks may change.

In properly managing cyber risk, it is desirable that valuations of cyber risks be done as a quantitative valuation with a statistical confidence level. One current method to accomplish this is the Applied Information Economics (AIE) approach described in *How to Measure Anything: Finding The Value of Intangibles in Business*, Third Edition by Douglas W. Hubbard, published by Wiley, Mar. 17, 2014. This method entails individuals making estimations to invest time and money to become calibrated to a specific confidence level of estimation. Alternatively, similar results can be obtained by acquiring values of factors figuring into cyber risk (i.e., potential impact and probability values) from sources and personnel closest to the source of those data values, while maintaining the ability to use AIE calibrated individuals. For example, a database administrator may be more accurate in his estimation of the number of records in a database than would legal department personnel, yet legal department personnel may be more accurate than the database administrator in assigning a legal cost to a single record loss.

Once a quantitative cyber risk value is determined, a fidelity level value that represents the valuator's estimate as to how closely his estimate of cyber risk matches reality can be assigned. It is thought that fidelity is an engineering concept that is more approachable to the layman than a confidence level, but the fidelity level can be transformed into confidence levels when desired for statistical computation. Fidelity levels also promote intuitive organizational risk governance by allowing an organization-defined bounding of individual fidelity levels. Once defined, overall risk-based decisions can be improved by improving fidelity levels of estimates.

In managing cyber risk, the entirety of a large set of risk-related data are desirably evaluated in a timely manner, but most current approaches to cyber risk management rely on periodic assessments (most often quarterly or yearly) based on surveys, consensus, and heatmaps to evaluate the cyber risk elements active at that time and to develop a snapshot of cyber risk at the time of the assessment. Because risk-related data changes rapidly, results from most current approaches to cyber risk become quickly outdated and remain so until the next assessment. Current cyber risk management approaches are akin to attempting financial management without the benefit of timely financial accounting processes.

In managing cyber risk, the presentation of the cyber risk analysis results may desirably be tailored to the intended audience in a form that is of utility to the recipient if the analysis is to be useful. Most current cyber risk management approaches are designed to present results for use by risk officers, financial officers, boards of directors, and other high-level personnel, and the results of the assessments are not readily consumed or understood by others in the organization.

The present disclosure teaches a multiple presentation fidelity-level based quantitative cyber risk decision support system. This system analyzes and evaluates cyber risk and bounds the determined cyber risk based on iteratively refined assessment fidelity and provides an outcome of evaluated cyber risk with multiple presentations according to recipient roles or responsibilities. For example, the same calculated risk may be presented to a chief information security officer (CISO) as a dollar figure plus or minus an error figure (e.g., a $6 M risk±$500 K) and presented to a security operation center (SOC) operator as a prioritized task list of 5 risk mitigation actions to be performed. The CISO can use the presentation of the cyber risk expressed in terms of dollars to evaluate the acceptability of the risk and the prudence of spending money to reduce the risk. The SOC operator can use the presentation of the cyber risk expressed in terms of a prioritized task list to begin implementing risk mitigation actions.

The varied presentation of risk may be referred to in some contexts as multiple presentations. Different presentations may be derived from the same calculated risk through execution of different presentation methods, a different presentation method for each different organizational function user role. Each different presentation method may develop a presentation based on the calculated risk, based on the assessment fidelity, and based on other cyber threat information. For example, the presentation method for the SOC operator level of the enterprise may be based in part on cyber risk mitigation actions that may be taken and based in part on an inventory of computing equipment and software installed on that computer equipment.

The presentation methods associated with different organizational function user roles may each define a threshold level of fidelity below which a calculated risk associated with a given risk element is not presented. This recognizes the experience that risk assessments that may be relatively immature could be actionable to a first organizational function but not actionable to a second organizational function. For example, if a calculated risk associated with a risk element has a low fidelity it may still be useful in developing a task list for a SOC operator and may still be useful in prioritizing a risk mitigation task associated with the risk element among other risk mitigation tasks. On the other hand, a calculated risk that has a low fidelity may not be useful to a CISO because it is not yet mature enough to make commitments of enterprise budget funds.

The elements of the risk assessment are associated with a fidelity quantification that the system automatically refines over time, reducing the expected variance (i.e., increasing the fidelity) from the nominal risk assessment based on calibrating training and calibrating activities of the risk assessor. In an embodiment, the risk assessment of asset cyber risks is reiterated continuously or periodically. Between risk assessment iterations, the fidelity quantification assigned to that risk assessment is adjusted according to a fidelity aging function defined for the subject potential impact and probability values (i.e., different potential impacts or probabilities may have different aging functions defined for their fidelity). Thus, a risk assessment that is associated with a ±15% fidelity initially may age over a period of two weeks to a ±20% fidelity. Fidelity aging reflects the insight that a risk assessment done at a specific point in time may not be as accurate as time passes, threats evolve, and cyber criminals turn their attention to new prey. Said in other words, over time the conditions and context on which a risk assessment may have been made changed, and the risk assessment based on those different conditions and/or context would likely vary somewhat from the previous risk assessment.

The fidelity aging function may take account of an amount of time that has passed since the most recent execution of an update rule associated with an asset, but it may also take account of other factors such as a volume of cyber threat event log entries and/or cyber threat data that has been added to a data store or plurality of data stores since the last execution of the update rule, a volume of network traffic within the enterprise, and/or a general cyber threat level of the enterprise. For example, if a greater than normal volume of cyber threat event log entries has been added to data stores since the last execution of the update rule, on a pro rata basis, the aging of risk assessments may be accelerated, while if a lesser than normal volume of cyber threat event log entries has been added to the data stores, the aging of risk assessments may be retarded. For example, if a greater than normal volume of network traffic has occurred within the enterprise since the last execution of the update rule, on a pro rata basis, the aging of risk assessments may be accelerated, while if a lower than normal volume of network traffic has occurred within the enterprise, the aging of risk assessments may be retarded. For example, if the enterprise allocates three general cyber threat levels—for example a low threat level, a medium threat level, and a high threat level—if the threat level is at a high threat level, the aging of risk assessments may be accelerated, while if the threat level is at a low threat level, the aging of risk assessments may be retarded. For example, if the perception of an enterprise is negatively influenced by news events, the aging of risk assessments may be accelerated; if the perception of the enterprise is positively influenced by news events, the aging of risk assessments may be retarded.

Identities of assets deemed susceptible to cyber threats are gathered either from existing data stores or by employee entry. Employees of an enterprise who are close to and/or responsible for an asset use an interface of the system to define a risk element for the subject asset that comprises an initial potential impact value estimate for the asset as well as a fidelity estimate for the potential impact value estimate. The employee further may define an automatic update method or rule for the subject asset, whereby the system or the system assessing the cyber risk associated with the asset can execute the update method to update the cyber risk value estimate automatically. The employee further may define an automatic fidelity aging method or rule, whereby the system can execute the aging method to update the cyber risk estimate fidelity. It is an insight of the present disclosure that performing cyber risk assessments and defining update and fidelity update methods by individuals who are most closely associated with and hence more intimately familiar with the cyber risk tends to produce more accurate cyber risk assessments than if the assessment is instead made the responsibility of a far removed employee or group. For example, a database administrator may be more accurate in his estimation of the number of records in a database than would legal department personnel, yet legal department personnel may be more accurate than the database administrator in assigning a legal cost to a single record loss.

The risk assessments, risk update rule or method, and fidelity aging rule or method may be part of a risk ledger. A risk analysis component may call upon one or more methods of the risk ledger to cause updates of the risk assessments to take place, for example as the risk environment of an enterprise changes in real-time. The risk analysis component may rely, in part, upon a data store that comprises up-to-the minute information about cyber threats in the industry sector of the subject enterprise, information about cyber threats in the enterprise itself, information about applied countermeasures, information about security policies and procedures of the enterprise, information about evaluations of compliance with the security policies and procedures, information about training of employees of the enterprise in avoiding cyber threats.

The information technology system and/or computer system that implements the multiple presentation fidelity-level based quantitative cyber risk decision support system interacts indirectly with a variety of computer systems and software in the enterprise. It can either pull data from or receive data pushed from various data stores containing cyber security information, where different systems in the enterprise may write to the different data stores. For example, a firewall may write threat event log entries to a first data store coupled to the firewall. An intrusion detection system (IDS) may write threat event log entries to a second data store coupled to the IDS. Security agents executing on desk-top computers may write threat event log entries to yet a third data store coupled to the agents on the desk-top computers. Security applications on email servers and routers and hubs may write threat event log entries to a fourth data store. Other security information may be stored in a fifth data store, such as information about vendor software patches that are available, information about known countermeasures that are available, information about cyberattack experience. In an embodiment, all the data stores identified above as first, second, third, fourth, and fifth data stores may be combined in various combinations. In an embodiment, monitoring devices may monitor conditions and transmit threat event log entries to a data store. For example, the monitoring devices may monitor door access (e.g., a monitoring agent executing in a badge reader device controlling door access), temperatures, alternating current (AC) mains power quality, humidity, and other parameters that may impact cyber health and asset health. It is understood that this totality of information is changing rapidly and asynchronously. By having subject matter experts (e.g., individuals most closely associated with the various pools of available information) each define risk assessment/risk update methods or update rules, as well as fidelity aging rules, the rules/methods can be defined to ingest from the appropriate data store or data stores the most meaningful threat information for calculating and assessing the subject risk.

It will be appreciated that the multiple presentation fidelity-level based quantitative cyber risk decision support system disclosed herein is a computer solution to a computer problem. Cyber security is by definition a computer problem. Said in other words, a cyber threat inherently involves computers, computer technology, and electronic communications networks. A bullet fired at a human being is not a cyber threat, it is a physical threat. By contrast, a cyber threat expresses or is manifested against an electronic target. The present disclosure teaches a system and methods to refresh and maintain the cyber risk assessments and presentations or representations of those risk assessments in real-time: as time passes, threat event log entries are generated, as the cyber threat environment changes, the assessments and presentations of cyber threat is adapted immediately.

In an embodiment, the system (e.g., a multiple presentation fidelity-level based cyber risk decision support application executing on a computer system) is able to identify a suitable countermeasure or countermeasures, based on analysis of the cyber risks, and to automatically apply the countermeasure or countermeasure to a cyber asset or to a plurality of cyber assets. For example, the system may automatically invoke an application programming interface (API) of a firewall to add an Internet Protocol (IP) address or and IP address range to a blacklist maintained by the firewall (e.g., whereby the firewall blocks inbound traffic from any source IP address contained in the blacklist), for example when analysis of cyber threat event log entries indicates a host with the subject IP address is distributing malware. For example, the system may automatically invoke an API of a server to trigger an orderly power-off of the server, for example when a monitored temperature of a room containing the server exceeds a predefined temperature threshold. The system may consider automatically applying a countermeasure when a count of threat events of a specific type exceeds a predefined count threshold. The system may consider automatically applying a countermeasure when a risk score exceeds a predefined threshold. The system may consider automatically applying a countermeasure when a cyber risk is in a top rank of current risks.

The system, in deciding whether to automatically apply or not apply a countermeasure, may determine a risk of applying the countermeasure (e.g., cost of lost sales, cost of reduced employee efficiency because of degradation of enterprise network services, etc.) and compare the risk of applying the countermeasure against the risk of NOT applying the countermeasure. If the risk of applying the countermeasure automatically is greater than the risk posed by the cyber risk itself, the system might not automatically apply the countermeasure. In an embodiment, the system may be configured to automatically apply countermeasures which belong to a category of actions which are thought to be incapable of causing harm or incapable of causing significant harm. In an embodiment, the system may be configured to automatically apply countermeasures for which workarounds are readily available, for example shutting down a portion of the enterprise network where employees are still able to wirelessly couple to the enterprise network via wireless LAN connectivity. In an embodiment, the system may be configured to automatically apply countermeasures to mission critical cyber assets but not to automatically apply countermeasures to non-critical cyber assets.

Figure 1:
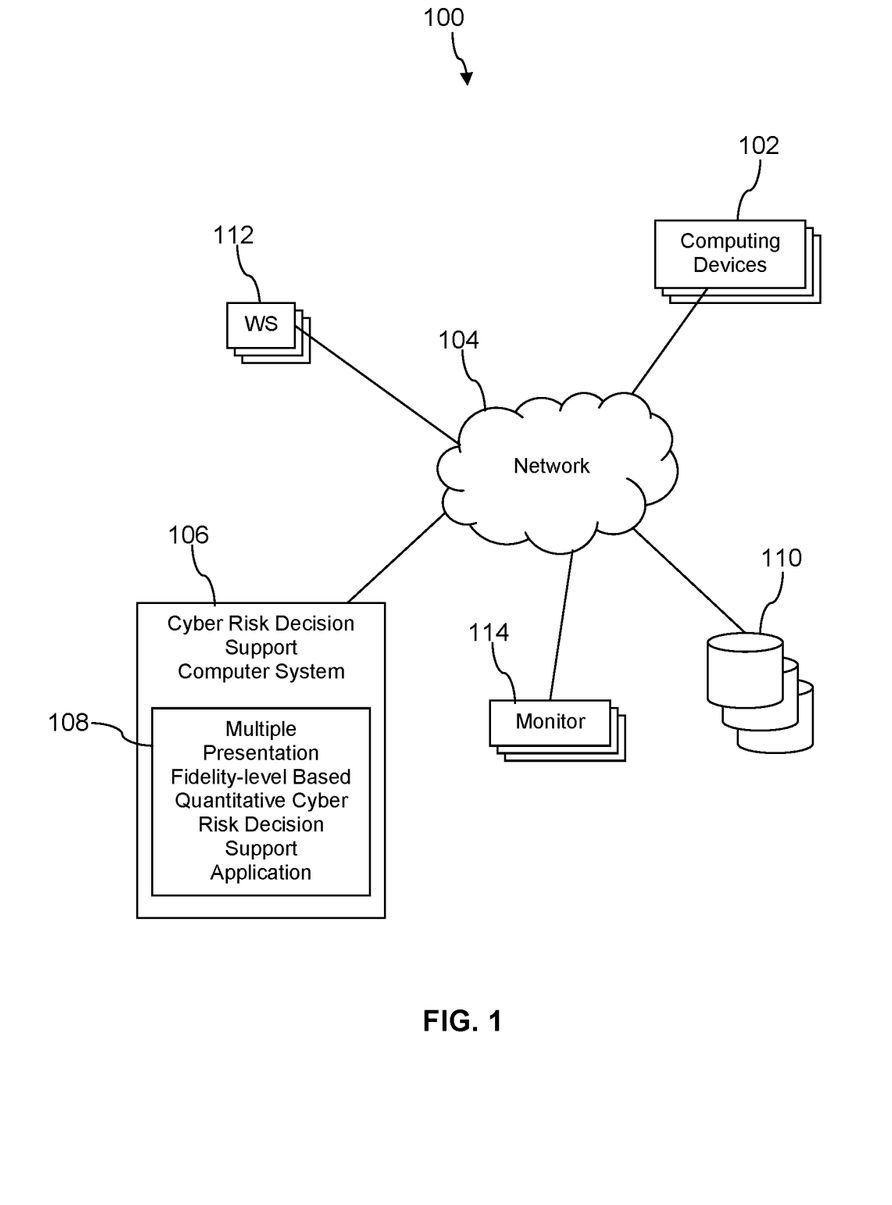
FIG. 1 is a block diagram of a system coupled to a multiple presentation fidelity-level based quantitative cyber risk decision support system according to an embodiment of the disclosure.

Turning now to FIG. 1, a system 100 is described. In an embodiment, the system 100 comprises a plurality of computing devices 102, a network 104, a cyber risk decision support computer system 106, a plurality of cyber risk decision support data stores 110, a plurality of cyber risk decision support work stations 112, and a plurality of monitor devices 114. The computing devices 102 comprise desktop computers, laptop computers, tablet computers, notebook computers, server computers, routers, hubs, printers, and/or other intelligent electronic devices that are communicatively coupled to the network 104. The computing devices 102 may comprise mobile communication devices such as mobile phones, smart phones, wearable computers, and headset computers. The network 104 is one or more private communication networks, one or more public communication networks, or a combination thereof. From some points of view, the routers and hubs mentioned above as being among the computing devices 102 may be considered to be part of the network 104, for example a private network portion of the network 104 (e.g., an enterprise communication network, where the enterprise owns the computing devices 102 or supports the computing devices on its private communication network). In an embodiment, the computing devices 102, the cyber risk decision support computer system 106, the cyber risk decision support data stores 110, and the cyber risk decision support work stations 112 may be protected from the open Internet (which in an embodiment may be considered to be part of the network 104 or at least communicatively coupled to the network 104) by one or more electronic security firewalls. These firewalls may be considered to be among the computing devices 102, part of the network 104, or part of the monitor devices 114.

The monitor devices 114 are computing devices that are coupled to the network 104 that monitor or sense, record, and report on various network conditions germane to cyber security and cyber health. As indicated above, the performance of the enterprise network can be degraded both by technology failures as well as cyberattacks. For example, over-temperature conditions in a server closet can damage server computers, for example may cause an email server to go down. For example, AC mains electrical power surges can cause computer failures. For example, jitter on AC mains electrical power can cause computer and/or electronic communication glitches. The monitor devices 114 can be located at different places in the enterprise coupled to the network 104 where they can monitor cyber performance and relevant operating conditions and report back to a multiple presentation fidelity-level based cyber risk decision support application 108 (hereinafter cyber risk decision support application or just application). Some of the monitor devices 114 may be coupled to the network 104 inside the enterprise firewall. Some of the monitor devices 114 may be coupled to the network 104 outside the enterprise firewall. The monitor devices 114 may be communicatively coupled to the network 104 by wired connections or by wireless connections.

A monitor device 114 may comprise a temperature monitor, a humidity monitor, a door access monitor, and/or an AC power mains monitor. A monitor device 114 may constitute a computer system, albeit in most instances a small computer system. The monitor device 114 may comprise a processor, a memory, a monitoring agent application stored in the memory executed by the processor, and an interface. The monitoring agent application monitors some condition in the environment (temperature, humidity, electrical voltage, position, proximity, etc.) via a sensor connected via an interface to the monitor device 114. If the monitored condition is deemed out of limits by the monitoring agent application, a log entry is generated and transmitted by the monitor device 114 via the network 104 to a data store 110. A door badge reader may be a monitor device 114 and may generate log entries that it sends to a data store 110 via the network 104.

The cyber risk decision support computer system 106 executes the cyber risk decision support application 108. The application 108 desirably promotes managing cyber risks to the computing devices 102, as well as to the work stations 112, to the data stores 110, monitor devices 114, and to the cyber risk decision support computer system 106, as well as to any enterprise firewalls, enterprise routers, and enterprise hubs that may be considered part of the network 104 but within the enterprise (as distinguished from outside the enterprise and in the open Internet).

The work stations 112 may be used to input information related to cyber security to one or more of the data stores 110, to provide inputs and data to the cyber risk decision support application 108, to provide inputs and data to the monitor devices 114, to present results of risk analysis, and optionally to initiate cyber risk countermeasures. Information about initiation of cyber risk countermeasures and previously installed cyber risk countermeasures may be stored in one or more of the data stores 110. The computing devices 102 and monitor devices 114—including firewalls, routers, and hubs that may be considered among the computing devices 102 or in a private network portion of the network 104—may execute security software that automatically generates cyber threat event log entries that are transmitted to and stored in the data stores 110. For example, an intrusion detection system (IDS) software may execute in series with the firewall, and the IDS software may create and transmit cyber threat event log entries related to types of traffic passing through the firewall and/or rejected by the firewall to one of the data stores 110. Likewise, security agents may execute on desktop and laptop computers of employees, monitoring IP addresses accessed, data communication patterns, and other security related behavior of those computers, generate cyber threat event log entries on those computers, generate cyber threat event log entries to one of the data stores 110. These cyber threat event log entries—from the firewall, from the IDS, and from security agents on computing devices 102 or monitor devices 114—are generated at asynchronous times. Said in other words, the security events occur asynchronously and substantially continuously, and hence the associated cyber threat event log entries are generated asynchronously and substantially continuously.

Figure 2:
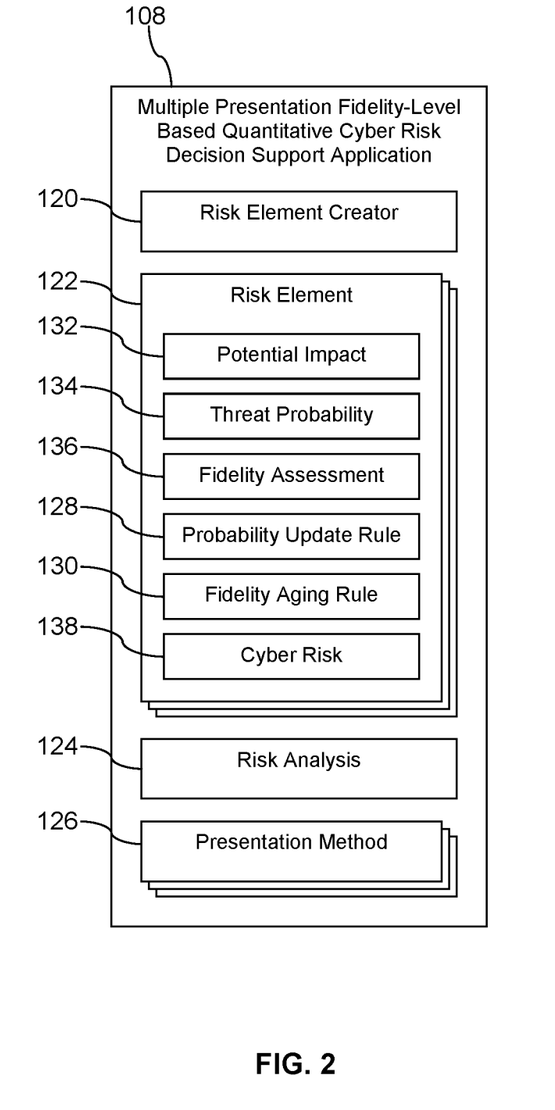
FIG. 2 is a block diagram of a multiple presentation fidelity-level based quantitative cyber risk decision support system according to an embodiment of the disclosure.

Turning now to FIG. 2, further details of the multiple presentation fidelity-level based quantitative cyber risk decision support application 108 are described. In an embodiment, the cyber risk decision support application 108 comprises a risk element creator 120 component, a plurality of risk elements 122, a risk analysis 124 component, and one or more presentation methods 126. In some contexts, the risk elements 122 may be said to comprise a risk register. In some embodiments, the one or more presentation methods 126 may be provided as part of the risk analysis 124 component. The risk element creator 120 provides an interface for creating, configuring, and revising risk elements 122. A risk element 122 comprises a potential asset impact 132, a cyber threat materialization probability 134, a fidelity assessment 136, a cyber threat materialization probability update rule 128, a fidelity aging rule 130, and a cyber risk 138. A risk element 122 may represent a single cyber threat risk. Because a single asset may be exposed to multiple different cyber threats each associated with different potential impacts on the asset (e.g., possibly different values of potential asset impact 132), each associated with different probabilities of being manifested or occurring (e.g., possibly different values of cyber threat materialization probability 134), each associated with different fidelity assessments (e.g., possibly different values of fidelity assessment 136), a plurality of risk elements 122 may be associated to the same single asset. The risk elements 122 may be stored in one of the data stores 110 after creation.

In an embodiment, the cyber risk of the risk element 122 is determined by the application 108 as the product of a value of the asset at risk and the probability that the subject cyber threat will successfully attack the asset.

$$\text{Cyber Risk} = (\text{value})(\text{probability of successful attack}) \quad \text{EQ 1}$$

A total cyber risk associated with a single asset can be determined as the sum of the cyber risks of all the risk elements 122 associated with that asset.

$$\text{Cyber Risk} = \Sigma_{i=1}^{n} (\text{value})_i (\text{probability of successful attack})_i \quad \text{EQ 2}$$

where $\text{value}_i$ is the value associated with an i-th cyber threat to which the asset is vulnerable, $\text{probability}_i$ is the probability that the i-th cyber threat will successfully attack the asset. It is noted that different asset values may pertain to different cyber threats to the same asset, because different cyber threats may put in jeopardy different portions of the total value of the asset. As conditions change and countermeasures are applied to the computing device 102, for example, both the asset value and the probability of a successful cyberattack on the asset can change. A rolled up or total cyber risk across a plurality of assets can be determined by summing the total cyber risk associated with each asset. It is understood that other methods and algorithms for calculating cyber risks and aggregated cyber risks may be used in combination with the teachings herein.

Both the potential asset impact 132 and the cyber threat materialization probability 134 may be subject to errors or imprecision in estimating as well as change over time. In some cases, the potential asset impact 132 may pertain not specifically to an asset itself but some costs or value associated with the asset. For example, cost of credit monitoring services, costs of legal expenses for a claim, costs of fines for failure to comply with regulatory mandates. The potential asset impact 132 may in part reflect costs that will be realized in the case of manifestation of the threat against the subject asset, for example costs in portions of the organization that rely on the proper function of the asset, for example losses in sales when an on-line retailing server fails or is attacked by malware.

In an embodiment, a rolled up total cyber risk or accumulated cyber risk value may be determined by summing the cyber risk 138 of each of the risk elements 122 associated with a given organizational partition or unit of the enterprise or the total enterprise. This rolled up total cyber risk value may be determined by the risk analysis component 124 evaluating the risk elements 122 based on the current threat context in the data stores 110. For example, the risk analysis component 124 may invoke the cyber threat materialization probability update rule 128 for each of the risk elements 122, thereby causing the cyber risk 138 to be updated for each risk element 122 based on the current threat context (e.g., based on cyber threat event log entries). The risk analysis component 124 may also invoke the fidelity aging rule 130 for each of the risk elements 122, thereby causing the fidelity assessment 136 to be updated for each risk element 122 based on the current threat context. The risk analysis component 124 can then determine a rolled up cyber risk across one or more portions of an organization or across the entire organization.

In the system 100, the data stores 110 are updated with cyber threat event log entries and cyber threat information on an on-going basis. Different computing devices 102 may automatically generate cyber threat event log entries that are stored in the data stores 110. For example, firewall devices may generate cyber threat event log entries about rejected communication attempts and what the basis for the rejection was, about trans-firewall communication volumes, about IP addresses of external devices. Information on numbers of computing devices 102 in the system 100 changes over time and is stored in the data stores 110.

The risk analysis 124 component may reanalyze the cyber risks using the risk elements 122 and the data in the data stores 110 periodically, for example every fifteen minutes, every hour, twice a day, or daily. The risk analysis 124 component may reanalyze the cyber risk once per week, once every two weeks, once per month, or once per quarter. The results of the analysis performed by the risk analysis 124 component changes both because data in the data stores 110 change and because the risk elements 122 change based on automated risk update rules 128. The risk analysis 124 component may execute the cyber threat materialization probability update rules 128 defined by the creator of the subject risk element 122. These update rules 128 calculate the cyber risk 138 associated with a risk element 122 based on data accessed from the data stores 110, for example cyber threat event log entries, countermeasure log entries, and the like.

Between iterations of the risk analysis 124 component, the fidelity assessments 136 of the risk elements 122 may be automatically updated by executing the fidelity aging rules 130 of the risk elements 122. The creator of the subject risk element 122 defines the fidelity aging rule 130. Some risk elements 122 would tend to change slowly, as for example the cost associated with a three year credit monitoring service may change slowly. Other risk elements 122 would tend to change rapidly. In the case of a slowly changing risk element 122, the fidelity aging rule 130 would reduce the fidelity assessment 136 (widen the range of variability of risk) more slowly; in the case of a rapidly changing risk element 122, the fidelity aging rule 130 would reduce the fidelity assessment 136 more quickly.

The presentation methods 126 may be designed to present the cyber risks 138 determined and stored in the risk elements 122 (e.g., in the data store 110) for use by different levels of an organization, for example at an executive level, at a tactical level, at a legal level, at a financial accounting level. Each different level may be associated with a different presentation method 126. A first presentation method 126 may create a presentation for the executive level that represents cyber risks 138 in units of dollars. A second presentation method 126 may create a presentation for a SOC operator that represents the cyber risks 138 as a priority ordered list of actions or tasks to take to manage or attenuate the risk. For the SOC operator, total cyber risk expressed in dollars may be meaningless, as he may have little control over allocating funds or migrating funds from one budget to another. But what may be useful for that SOC operator is a list of tasks that he or his subordinates can act upon today to have a meaningful effect on the organizations cyber risks.

Over time, the risk analysis 124 component converges on more accurate estimates of risk, due to a longer historical baseline of data in the data stores 110 and from convergence within the software of the risk analysis 124 component. This is reflected in increased fidelity estimates (reduced variability). In some cases, the presentation of risk at a particular organizational level (i.e., a specific presentation method 126) may be blocked until fidelity reaches a pre-defined threshold. Different levels or layers of an organization may be associated with different pre-defined thresholds of risk estimation fidelity. For example, it may be that the SOC operator can benefit from obtaining a list of prioritized security actions to perform even when the underlying risk assessment values are associated with a low fidelity value. Thus, the SOC operator can be taking risk attenuation or mitigation actions before the executive level sees the same risk in a risk valuation in dollar amounts.

Figure 3A:
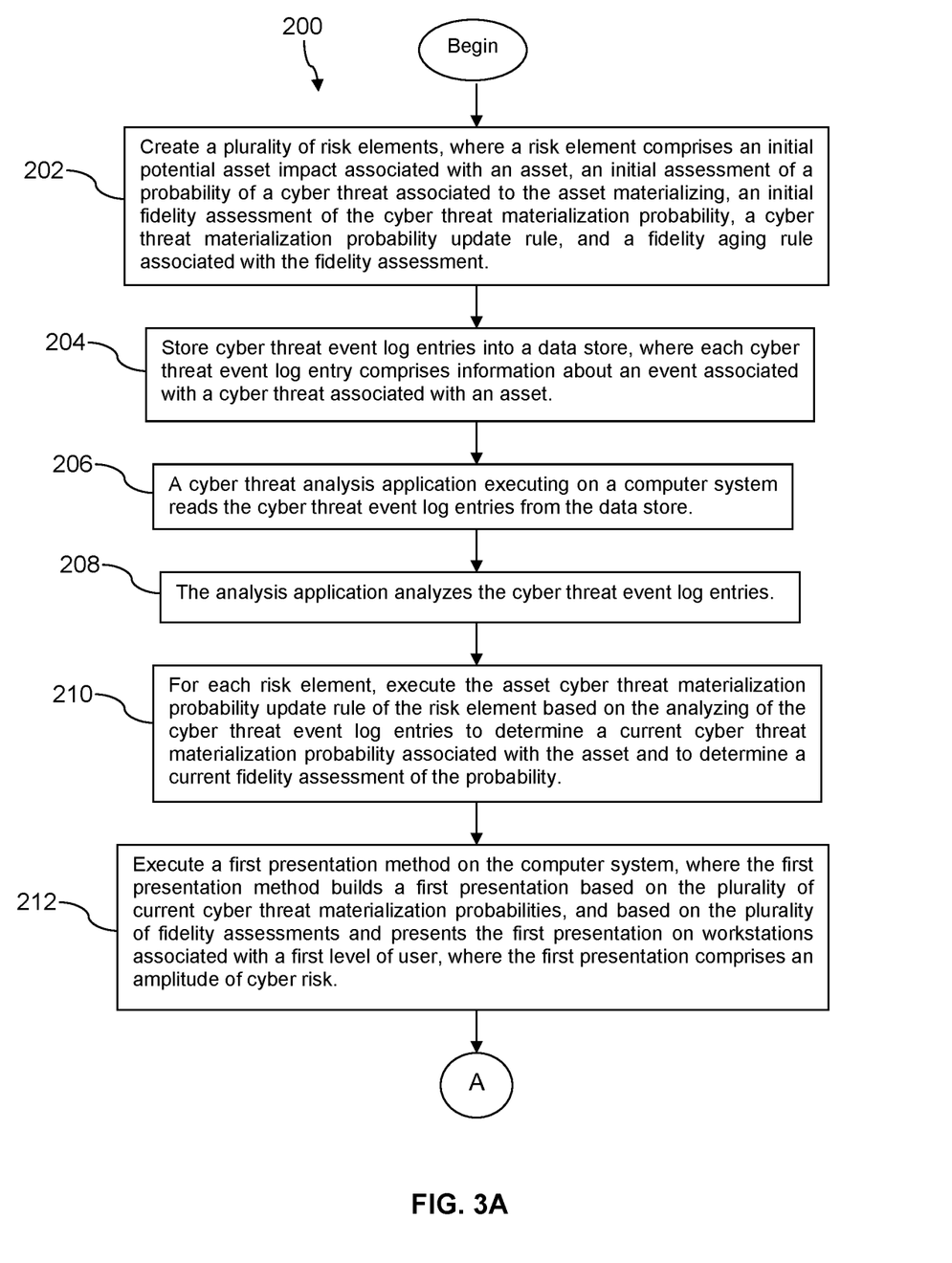
FIG. 3A and FIG. 3B is a flow chart of a method according to an embodiment of the disclosure.
Figure 3B:
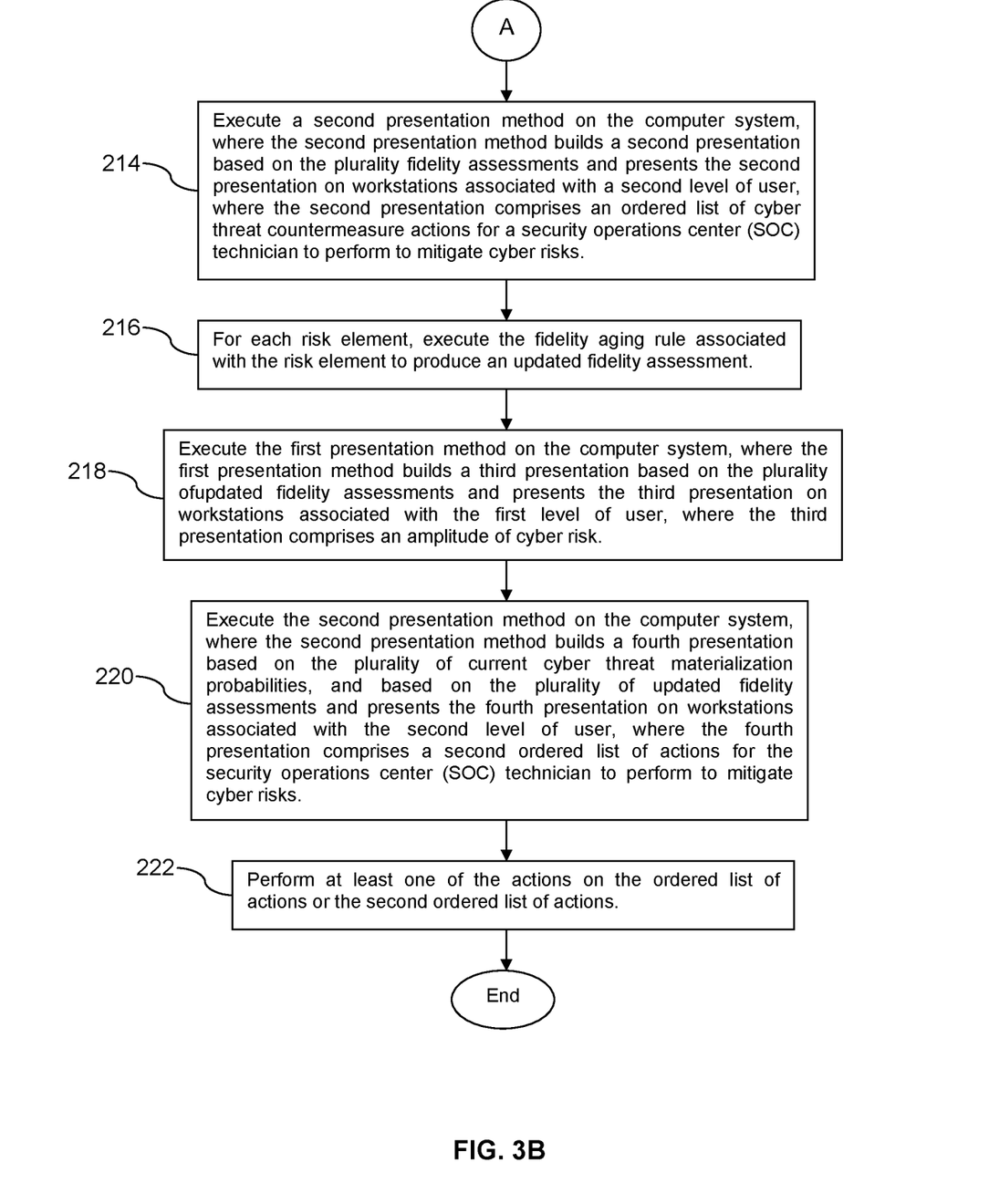

Turning now to FIG. 3A and FIG. 3B, a method 200 is described. The method 200 may be applied to mitigate cyber threat risks using a multiple presentation fidelity-level based quantitative cyber risk decision support system. At block 202, the method 200 comprises creating a plurality of risk elements, where a risk element comprises an initial potential asset impact associated with an asset, an initial assessment of a probability of a cyber threat associated to the asset materializing, an initial fidelity assessment of the cyber threat materialization probability, a cyber threat materialization probability update rule, and a fidelity aging rule associated with the fidelity assessment. The risk element 122 may be created using the risk element creator 120 component of the application 108, for example by a workstation 112 using a web interface extended by the risk element creator 120. The individual who creates the risk element 122 is desirably a person who is close to the specific risk element 122. For example, a database administrator may be closer to the credit card database and be more able to establish the number of credit cards in circulation.

At block 204, the method 200 comprises storing cyber threat event log entries into a data store, where each log entry comprises information about an event associated with a cyber threat associated with an asset. The cyber threat event log entries may be automatically generated by security agents executing on computing devices 102 and transmitted to the data stores 110. The cyber threat event log entries may be automatically generated by IDS software and/or firewall software and transmitted to the data stores 110. The cyber threat event log entries may be related to applied countermeasures. The cyber threat event log entries may be automatically generated by software executing on the monitor devices 114.

At block 206, the method 200 comprises reading the cyber threat event log entries from the data store by a cyber threat analysis application executing on a computer system. At block 208, the method 200 comprises analyzing the cyber threat event log entries by the analysis application.

At block 210, the method 200 comprises, for each risk element, executing the asset cyber threat materialization probability update rule of the risk element based on the analyzing of the cyber threat event log entries to determine a current cyber threat materialization probability associated with the asset and to determine a current fidelity assessment of the probability. At block 212, the method 200 comprises executing a first presentation method on the computer system, where the first presentation method builds a first presentation based on the plurality of initial potential asset impacts, based on the plurality of current cyber threat materialization probabilities, and based on the plurality of fidelity assessments and presents the first presentation on workstations associated with a first level of user, where the first presentation comprises an amplitude of cyber risk. For example the amplitude of cyber risk may be represented as a dollar amount.

At block 214, the method 200 comprises executing a second presentation method on the computer system, where the second presentation method builds a second presentation based on the plurality of initial potential asset impacts, based on the plurality of current cyber threat materialization probabilities, and based on the plurality of fidelity assessments and presents the second presentation on workstations associated with a second level of user, where the second presentation comprises an ordered list of cyber threat countermeasure actions for a security operations center (SOC) technician to perform to mitigate cyber risks. In an embodiment, the ordered list of actions may be an ordered list of cyber threat countermeasure actions. The method 200 may further comprise performing one or more of the cyber threat countermeasure actions from the ordered list of actions.

In an embodiment, the method 200 comprises identifying by the analysis application a first countermeasure action to apply based on the plurality of initial potential asset impacts and based on the plurality of current cyber threat materialization probabilities and applying the first countermeasure by the application, and where the second presentation further comprises an identity of the first countermeasure and an indication that it was automatically applied. The first countermeasure action may be applied to a cyber asset or a plurality of cyber assets. As an example, the first countermeasure action may automatically power-off a server in a server room whose temperature has risen above a predefined temperature threshold. The power-off may be performed in an orderly fashion to avoid any undesirable loss of data or corrupted transactions. As an example, an IP address or a range of IP addresses may be added to a black list of a firewall, whereby to block data entering an enterprise from one of the black listed IP addresses. It is understood that the multiple presentation fidelity-level based cyber risk decision support application invokes the first countermeasure action, for example invokes an API provided by the cyber asset or cyber assets. It is contemplated that the application may be enabled to identify a variety of countermeasures that it is authorized to invoke automatically, without relying on a human operator to trigger the activation of the countermeasure. In an embodiment, the application performs an assessment of the risk associated with applying the countermeasure (e.g., loss of sales, loss of worker productivity resulting from a degraded enterprise network, etc.) and compares the risk of applying the countermeasure to the risk of not applying the countermeasure and declines to apply the countermeasure if the comparison militates against applying the countermeasure (e.g., if the risk of applying the countermeasure is greater than the risk of the cyber threat).

At block 216, the method 200 comprises, for each risk element, executing the fidelity aging rule associated with the risk element to produce an updated fidelity assessment. At block 218, the method 200 comprises executing the first presentation method on the computer system, where the first presentation method builds a third presentation based on the plurality of initial potential asset impacts, based on the plurality of current cyber threat materialization probabilities, and based on the plurality of updated fidelity assessments and presents the third presentation on workstations associated with the first level of user, where the third presentation comprises an amplitude of cyber risk. It is understood that the third presentation may be different from the first presentation, because the fidelity may have changed.

At block 220, the method 200 comprises executing the second presentation method on the computer system, where the second presentation method builds a fourth presentation based on the plurality of initial potential asset impacts, based on the plurality of current cyber threat materialization probabilities, and based on the plurality of updated fidelity assessments and presents the fourth presentation on workstations associated with the second level of user, where the fourth presentation comprises a second ordered list of actions for the security operations center (SOC) technician to perform to mitigate cyber risks. It is understood that the fourth presentation may be different from the second presentation because the fidelity may have changed. At block 222, the method 200 comprises performing at least one of the cyber threat countermeasure actions in the ordered list of actions.

A cyber threat countermeasure action taken may be deploying a new password policy (e.g., impose a requirement of a minimum number of symbols [e.g., at least 8 symbols], a requirement of at least one numeral symbol, a requirement of at least one special character, an exclusion of any password found in a dictionary of most common passwords). Such a password policy may be referred to as implementing a restricted password policy. The countermeasure action taken may be implementing employee training to resist phishing attempts. The counter measure action taken may be blocking execution of links embedded in emails. The countermeasure action taken may be reducing the number of at risk credit cards by locking disused credit cards (e.g., credit cards that have not been used for at least a year).

Figure 4:
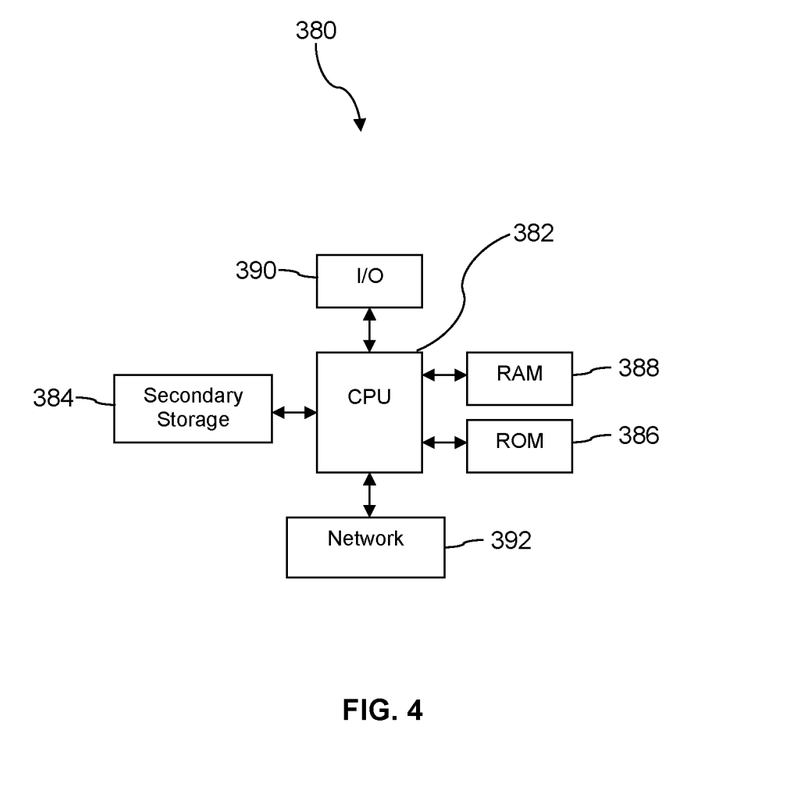
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of mitigating cyber threat risks using a multiple presentation fidelity-level based quantitative cyber risk decision support system, comprising:

creating a plurality of risk elements, where a risk element comprises an initial potential asset impact associated with an asset, an initial assessment of a probability of a cyber threat associated to the asset materializing, an initial fidelity assessment of the cyber threat materialization probability, a cyber threat materialization probability update rule, and a fidelity aging rule associated with the fidelity assessment;

storing cyber threat event log entries into a data store, where each log entry comprises information about an event associated with a cyber threat associated with an asset;

reading the cyber threat event log entries from the data store by a cyber threat analysis application executing on a computer system;

analyzing the cyber threat event log entries by the analysis application;

for each risk element, executing the asset cyber threat materialization probability update rule of the risk element based on the analyzing of the cyber threat event log entries to determine a current cyber threat materialization probability associated with the asset and to determine a current fidelity assessment of the probability;

executing a first presentation method on the computer system, where the first presentation method builds a first presentation based on the plurality of initial potential asset impacts, based on the plurality of current cyber threat materialization probabilities, and based on the plurality of fidelity assessments and presents the first presentation on workstations associated with a first level of user, where the first presentation comprises an amplitude of cyber risk;

executing a second presentation method on the computer system, where the second presentation method builds a second presentation based on the plurality of initial potential asset impacts, based on the plurality of current cyber threat materialization probabilities, and based on the plurality of fidelity assessments and presents the second presentation on workstations associated with a second level of user, where the second presentation comprises an ordered list of cyber threat countermeasure actions for a security operations center (SOC) technician to perform to mitigate cyber risks; and performing at least one of the cyber threat countermeasure actions in the ordered list of actions.

2. The method of claim 1, wherein the ordered list of cyber threat countermeasure actions comprises providing training in how to avoid phishing attacks to members of an organization.

3. The method of claim 1, wherein the ordered list of cyber threat countermeasure actions comprises deploying a restricted individual password policy.

4. The method of claim 1, wherein the ordered list of cyber threat countermeasure actions comprises blocking email links being activated to go out to the Internet.

5. The method of claim 1, where some of the cyber threat event log entries are generated by a laptop computer, a desktop computer, or a server computer.

6. The method of claim 5, where some of the cyber threat event log entries are generated by a temperature monitor, a humidity monitor, a door access monitor, or an alternating current (AC) power mains monitor.

7. The method of claim 1, where a cyber threat comprises a denial of service (DOS) attack, a malware, an identity theft, an electrical power failure, an unstable electrical power condition, an over temperature, a low humidity level, or a high humidity level.

8. A method of mitigating cyber threat risks in a plurality of computers using a multiple presentation fidelity-level based quantitative cyber risk decision support system, comprising:

creating a plurality of risk elements, where a risk element comprises an initial potential asset impact associated with an asset, an initial assessment of a probability of a cyber threat associated to the cyber asset materializing, an initial fidelity assessment of the cyber threat materialization probability, a cyber threat materialization probability update rule, and a fidelity aging rule associated with the fidelity assessment;

storing cyber threat event log entries into a data store, where each cyber threat event log entry comprises information about an event associated with a cyber threat associated with an asset;

reading the cyber threat event log entries from the data store by a cyber threat analysis application executing on a computer system;

analyzing the cyber threat event log entries by the analysis application;

for each risk element, executing the asset cyber threat materialization probability update rule of the risk element based on the analyzing of the cyber threat event log entries to determine a current probability of cyber threat materialization probability and to determine a current fidelity assessment of the probability;

executing a first presentation method on the computer system, where the first presentation method builds a first presentation based on the plurality of initial potential asset impacts, based on the plurality of current cyber threat materialization probabilities, and based on the plurality of fidelity assessments and presents the first presentation on workstations associated with a first level of user, where the first presentation comprises an amplitude of cyber risk;

executing a second presentation method on the computer system, where the second presentation method builds a second presentation based on the plurality of initial potential asset impacts, based on the plurality of current cyber threat materialization probabilities, and based on the plurality of fidelity assessments and presents the second presentation on workstations associated with a second level of user, where the second presentation comprises an ordered list of actions for a security operations center (SOC) technician to perform to mitigate cyber risks;

for each risk element, executing the fidelity aging rule associated with the risk element to produce an updated fidelity assessment;

executing the first presentation method on the computer system, where the first presentation method builds a third presentation based on the plurality of initial potential asset impacts, based on the plurality of current cyber threat materialization probabilities, and based on the plurality of updated fidelity assessments and presents the third presentation on workstations associated with the first level of user, where the third presentation comprises an amplitude of cyber risk; and executing the second presentation method on the computer system, where the second presentation method builds a fourth presentation based on the plurality of initial potential asset impacts, based on the plurality of current cyber threat materialization probabilities, and based on the plurality of updated fidelity assessments and presents the fourth presentation on workstations associated with the second level of user, where the fourth presentation comprises a second ordered list of actions for the security operations center (SOC) technician to perform to mitigate cyber risks.

9. The method of claim 8, wherein at least some of the cyber threat event log entries are generated by security agents executing on desk-top computers.

10. The method of claim 8, wherein at least some of the cyber threat event log entries are generated by security applications executing on email servers, routers, and hubs.

11. The method of claim 8, wherein the ordered list of actions comprises providing training in how to avoid phishing attacks to members of an organization.

12. The method of claim 8, wherein the ordered list of actions comprises deploying a restricted password policy.

13. The method of claim 8, where some of the cyber threat event log entries are generated by a temperature monitor, a humidity monitor, a door access monitor, or an alternating current (AC) power mains monitor.

14. The method of claim 8, where a cyber threat comprises a denial of service (DOS) attack, a malware, an identity theft, an electrical power failure, an unstable electrical power condition, an over temperature, a low humidity level, or a high humidity level.

15. A multiple presentation fidelity-level based quantitative cyber risk decision support system, comprising:
a processor;
a non-transitory memory, where the non-transitory memory stores a plurality of risk elements, where each risk element comprises an initial potential asset impact associated with an asset, an initial assessment of a probability of a cyber threat associated to the asset materializing, an initial fidelity assessment of the cyber threat materialization probability, a cyber threat materialization probability update rule, and a fidelity aging rule associated with the fidelity assessment;

a data store comprising cyber threat event log entries, where each cyber threat event log entry comprises information about an event associated with a cyber threat associated with an asset; and a cyber threat analysis application stored in the non-transitory memory that, when executed by the processor;
reads the cyber threat event log entries from the data store,
analyzes the cyber threat event log entries,
for each risk element, executes the asset cyber threat materialization probability update rule of the risk element based on the analyzing of the cyber threat event log entries to determine a current cyber threat materialization probability and to determine a current fidelity assessment of the probability,
executes a first presentation method, where the first presentation method builds a first presentation based on the plurality of initial potential asset impacts, based on the plurality of current cyber threat materialization probabilities, and based on the plurality of fidelity assessments and presents the first presentation on workstations associated with a first level of user, where the first presentation comprises an amplitude of cyber risk, and
executes a second presentation method, where the second presentation method builds a second presentation based on the plurality of initial potential asset impacts, based on the plurality of current cyber threat materialization probabilities, and based on the plurality of fidelity assessments and presents the second presentation on workstations associated with a second level of user, where the second presentation comprises an ordered list of actions for a security operations center (SOC) technician to perform to mitigate cyber risks.

16. The system of claim 15, wherein the cyber threat event log entries are written to the data store by desk-top computers, firewalls, routers, email servers, or hubs.

17. The system of claim 16, further comprising a plurality of cyber threat monitors that write cyber threat event log entries to the data store.

18. The system of claim 17, wherein a cyber threat monitor comprises an access card reader, a temperature monitor, a humidity monitor, or an alternating current (AC) mains power quality monitor.

19. The system of claim 15, wherein the ordered list of actions comprises deploying a restricted individual password policy.

20. The system of claim 15, wherein the cyber threat analysis application further:
for each risk element, executes the fidelity aging rule associated with the risk element to produce an updated fidelity assessment;
executes the first presentation method, where the first presentation method builds a third presentation based on the plurality of initial potential asset impacts, based on the plurality of current cyber threat materialization probabilities, and based on the plurality of updated fidelity assessments and presents the third presentation on workstations associated with the first level of user, where the third presentation comprises an amplitude of cyber risk; and
executes the second presentation method, where the second presentation method builds a fourth presentation based on the plurality of initial potential asset impacts, based on the plurality of current cyber threat materialization probabilities, and based on the plurality of updated fidelity assessments and presents the fourth presentation on workstations associated with the second level of user, where the fourth presentation comprises a second ordered list of actions for the security operations center (SOC) technician to perform to mitigate cyber risks.

\* \* \* \* \*